(12) United States Patent
Tsubouchi et al.

(10) Patent No.: US 10,490,859 B2
(45) Date of Patent: Nov. 26, 2019

(54) LITHIUM-ION SECONDARY BATTERY

(71) Applicant: TOYOTA JIDOSHA KABUSHIKI KAISHA, Toyota-shi, Aichi-ken (JP)

(72) Inventors: Hiroshi Tsubouchi, Okazaki (JP); Keiichi Takahashi, Nishinomiya (JP); Naoyuki Wada, Hirakata (JP); Yukihiro Okada, Shijonawate (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 88 days.

(21) Appl. No.: 15/837,686

(22) Filed: Dec. 11, 2017

(65) Prior Publication Data

US 2018/0183111 A1 Jun. 28, 2018

(30) Foreign Application Priority Data

Dec. 22, 2016 (JP) ................. 2016-249609

(51) Int. Cl.
| | |
|---|---|
| *H01M 10/42* | (2006.01) |
| *H01M 4/36* | (2006.01) |
| *H01M 2/34* | (2006.01) |
| *H01M 10/0525* | (2010.01) |
| *H01M 4/505* | (2010.01) |
| *H01M 10/0567* | (2010.01) |

(Continued)

(52) U.S. Cl.
CPC ....... *H01M 10/4235* (2013.01); *H01M 2/345* (2013.01); *H01M 4/364* (2013.01); *H01M 4/366* (2013.01); *H01M 4/505* (2013.01); *H01M 4/525* (2013.01); *H01M 4/62* (2013.01); *H01M 10/0525* (2013.01); *H01M 10/0567* (2013.01); *H01M 2/12* (2013.01); *H01M 2004/028* (2013.01); *H01M 2200/20* (2013.01)

(58) Field of Classification Search
CPC ................................................ H01M 2200/20
See application file for complete search history.

(56) References Cited

U.S. PATENT DOCUMENTS

2010/0279156 A1   11/2010   Kim et al.
2013/0273429 A1   10/2013   Yu
(Continued)

FOREIGN PATENT DOCUMENTS

JP   2011-018645 A   1/2011
WO   2012/118052 A1   9/2012

*Primary Examiner* — Scott J. Chmielecki
(74) *Attorney, Agent, or Firm* — Sughrue Mion, PLLC

(57) ABSTRACT

A positive electrode of a lithium-ion secondary battery contains first positive electrode active material particles and second positive electrode active material particles. The first positive electrode active material particles have a first composition represented by a compositional formula $LiNi_{x1}Co_{y1}Mn_{z1}O_2$ (here, x1, y1, and z1 are numerical values satisfying $0<x1<1$, $0<y1<1$, $0.3<z1<0.5$, and $x1+y1+z1=1$). The second positive electrode active material particles have a second composition represented by a compositional formula $LiNi_{x2}Co_{y2}Mn_{z2}O_2$ (here, x2, y2, and z2 are numerical values satisfying $0<x2<1$, $0<y2<1$, $0<z2<0.2$, and $x2+y2+z2=1$). The surface of at least one of the first positive electrode active material particles and the second positive electrode active material particles is coated with a transition metal oxide.

7 Claims, 5 Drawing Sheets

(51) Int. Cl.
  *H01M 4/525*  (2010.01)
  *H01M 4/62*   (2006.01)
  *H01M 2/12*   (2006.01)
  *H01M 4/02*   (2006.01)

(56) References Cited

U.S. PATENT DOCUMENTS

| | | | |
|---|---|---|---|
| 2016/0190595 A1* | 6/2016 | Takahata | H01M 4/485 |
| | | | 429/199 |
| 2016/0336545 A1* | 11/2016 | Wakimoto | H01M 2/345 |
| 2017/0092980 A1* | 3/2017 | Wakimoto | H01M 2/0217 |
| 2017/0222223 A1* | 8/2017 | Hong | H01M 4/525 |
| 2017/0373352 A1* | 12/2017 | Saka | H01M 2/1077 |
| 2018/0076450 A1* | 3/2018 | Torita | H01M 4/505 |
| 2018/0212237 A1* | 7/2018 | Lee | H01M 4/0435 |

* cited by examiner

LITHIUM-ION SECONDARY BATTERY

INCORPORATION BY REFERENCE

The disclosure of Japanese Patent Application No. 2016-249609 filed on Dec. 22, 2016 including the specification, drawings and abstract is incorporated herein by reference in its entirety.

BACKGROUND

1. Technical Field

The disclosure relates to a lithium-ion secondary battery.

2. Description of Related Art

Ternary positive electrode active material particles (LiNi$_x$Co$_y$Mn$_z$O$_2$) containing three kinds of transition metals, nickel (Ni), cobalt (Co), and manganese (Mn), are known. WO 2012/118052 discloses the use of two kinds of ternary positive electrode active material particles with different compositions in combination.

SUMMARY

A mechanism for safely stopping a battery function (hereinafter, referred to as "pressure operated safety mechanism") during overcharging is proposed. The pressure operated safety mechanism converts a pressure applied by generated gas into a mechanical operation such as breaking a circuit. An overcharge additive is added to an electrolytic solution in order to promote the operation of the pressure operated safety mechanism. During overcharging, in a positive electrode at a relatively high potential, gas is generated by oxidation of the overcharge additive.

In order to rapidly operate the pressure operated safety mechanism, it is desirable that the amount of generated gas increases acceleratively as charging progresses further, that is, as the state of charge (SOC) increases. However, in a lithium-ion secondary battery including ternary positive electrode active material particles in the positive electrode, a gas generation reaction tends to become inactive as the SOC increases. Accordingly, there is a possibility that the total amount of generated gas is smaller than usual.

The disclosure provides a lithium-ion secondary battery capable of efficiently generating gas during overcharging even when charging progresses further.

Hereinafter, the technical configuration and operational effects of the disclosure will be described. The operation mechanism of the disclosure includes estimation. The scope of the disclosure should not be limited by whether or not the operation mechanism is correct.

An aspect of the disclosure relates to a lithium-ion secondary battery including: a housing; a pressure operated safety mechanism configured to operate in response to an internal pressure of the housing; a positive electrode accommodated in the housing; a negative electrode accommodated in the housing; and an electrolytic solution stored in the housing. The positive electrode contains first positive electrode active material particles and second positive electrode active material particles. The first positive electrode active material particles and the second positive electrode active material particles satisfy a relationship of first positive electrode active material particles:second positive electrode active material particles=74:26 to 48:52 in terms of mass ratio. The first positive electrode active material particles have a first composition represented by a compositional formula LiNi$_{x1}$Co$_{y1}$Mn$_{z1}$O$_2$ (here, x1, y1, and z1 are numerical values satisfying 0<x1<1, 0<y1<1, 0.3<z1<0.5, and x1+y1+z1=1). The second positive electrode active material particles have a second composition represented by a compositional formula LiNi$_{x2}$Co$_{y2}$Mn$_{z2}$O$_2$ (here, x2, y2, and z2 are numerical values satisfying 0<x2<1, 0<y2<1, 0<z2<0.2, and x2+y2+z2=1). The surface of at least one of the first positive electrode active material particles and the second positive electrode active material particles is coated with a transition metal oxide. The transition metal oxide contains a transition metal other than Ni, Co, and Mn. The electrolytic solution contains an overcharge additive.

The lithium-ion secondary battery (hereinafter, sometimes abbreviated to "battery") of the disclosure contains two kinds of ternary positive electrode active material particles (the first positive electrode active material particles and the second positive electrode active material particles) with different Mn contents. It is considered that in a case where the first positive electrode active material particles and the second positive electrode active material particles having the compositions coexist with each other, the battery temperature is less likely to increase during overcharging, and thus a gas generation reaction becomes more inactive.

According to the aspect of the disclosure, the mixing ratio of the first positive electrode active material particles and the second positive electrode active material particles is in a specific range. Furthermore, the surface of at least one of the first positive electrode active material particles and the second positive electrode active material particles is in a state of being coated with the transition metal oxide. Therefore, the amount of generated gas during overcharging increases.

As charging progresses, the crystal structure of the ternary positive electrode active material particles becomes unstable, so that the elution of Mn is likely to occur. It is considered that this is because a portion of electrical energy supplied to the positive electrode during overcharging is consumed by a Mn elution reaction and a Mn precipitation reaction, and an increase in the positive electrode potential and an increase in the battery temperature are slowed. That is, the elution of Mn is thought to be one of the factors that cause the gas generation reaction to become inactive when charging progresses further. In the aspect of the disclosure, the transition metal oxide coating the ternary positive electrode active material particles is thought to have an action of efficiently suppressing the elution of Mn. Therefore, it is considered that with the battery according to the aspect of the disclosure, the inactivation of the gas generation reaction due to the elution of Mn from the ternary positive electrode active material particles is efficiently suppressed.

Furthermore, it is considered that a charging reaction is less likely to occur in a region coated with the transition metal oxide. That is, it is considered that the resistance against the reaction further increases. Accordingly, it is considered that an increase in the battery temperature due to the progress of the charging is further promoted and the gas generation reaction becomes more active.

As described above, according to the aspect of the disclosure, it is considered that gas is efficiently generated during overcharging even when charging progresses further (for example, when charging progresses until the SOC reaches 140% to 160%).

However, the relationship of first positive electrode active material particles:second positive electrode active material particles=74:26 to 48:52 in terms of mass ratio needs to be satisfied. In a case where the relationship is not satisfied, when charging progresses further, there is a possibility that the efficiency of gas generation may become lower than usual.

In the lithium-ion secondary battery according to the aspect, the surface of the first positive electrode active material particles may be coated with the transition metal oxide. In the aspect of the disclosure, the Mn content ($z1$) of the first positive electrode active material particles is larger than the Mn content ($z2$) of the second positive electrode active material particles. It is considered that the potential of the first positive electrode active material particles more easily increases than the second positive electrode active material particles during overcharging. Therefore, the amount of gas generated from the first positive electrode active material particles is expected to be larger than the amount of gas generated from the second positive electrode active material particles. On the other hand, it is considered that the elution of Mn from the first positive electrode active material particles also easily occurs. It is considered that since the first positive electrode active material particles are coated with the transition metal oxide, the elution of Mn from the first positive electrode active material particles is efficiently suppressed, and the efficiency of gas generation when charging progresses further is further improved.

In the lithium-ion secondary battery according to the aspect, $x1$ and $y1$ may be numerical values satisfying $0.3<x1<0.5$ and $0.1<y1<0.3$, and $x2$ and $y2$ may be numerical values satisfying $0.3<x2<0.5$ and $0.4<y2<0.6$. According to the aspect of the disclosure, since the relationship is satisfied, for example, a further improvement in discharge performance and the like is expected.

In the lithium-ion secondary battery according to the aspect, the transition metal oxide may have a lower resistivity than the first positive electrode active material particles and the second positive electrode active material particles. According to the aspect of the disclosure, it is considered that since the resistivity of the transition metal oxide is low, electron conduction at the surface of the particles is promoted. It is considered that this further promotes the gas generation reaction.

In the lithium-ion secondary battery according to the aspect, the transition metal oxide may be at least one selected from the group consisting of titanium oxide, tungsten oxide, and molybdenum oxide. According to the aspect of the disclosure, the transition metal oxide mentioned above has a low resistivity and is suitable for the transition metal oxide of the embodiment.

In the lithium-ion secondary battery according to the aspect, in the first positive electrode active material particles or the second positive electrode active material particles coated with the transition metal oxide, the mass ratio of the transition metal oxide to a total mass of the first positive electrode active material particles or the second positive electrode active material particles and the transition metal oxide may be 2 mass % or more and 6 mass % or less. Hereinafter, the mass ratio is also referred to as "coating amount". According to the aspect of the disclosure, when the coating amount is 2 mass % or more, the effect of suppressing the elution of Mn is expected to further increase. When the coating amount is 6 mass % or less, it is considered that the inhibition of the diffusion of Li ions due to the transition metal oxide is efficiently suppressed.

In the lithium-ion secondary battery according to the aspect, the overcharge additive may be at least one selected from the group consisting of cyclohexylbenzene, biphenyl, methylphenyl carbonate, diphenyl carbonate, and triphenyl phosphate. According to the aspect of the disclosure, the compound mentioned above causes a relatively large amount of gas to be generated and is thus suitable for the overcharge additive of the aspect of the disclosure.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the disclosure (hereinafter, referred to as "the embodiment") will be described. However, the following description does not limit the scope of the disclosure.

Lithium-Ion Secondary Battery

Figure 1:
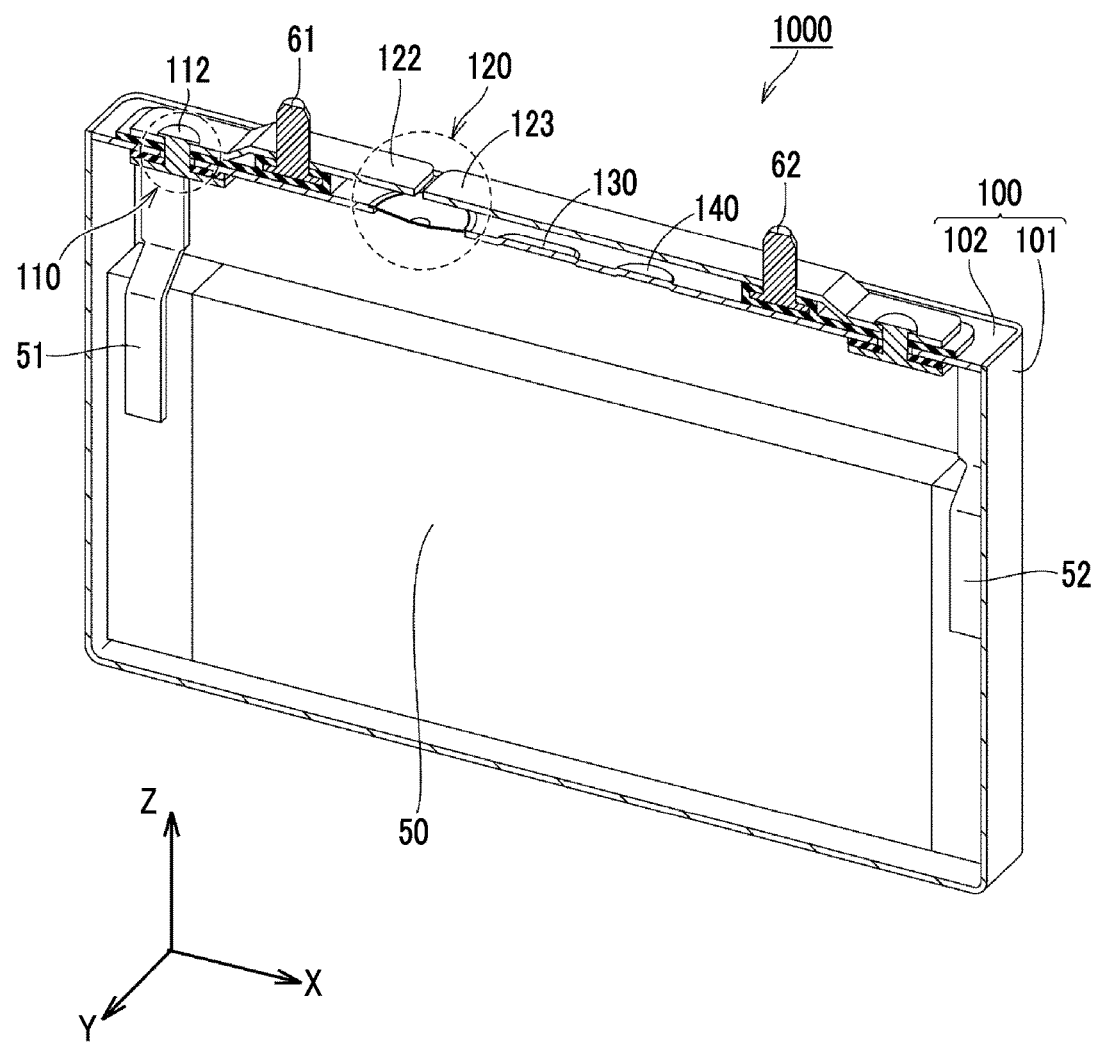
FIG. 1 is a schematic view illustrating an example of a configuration of a lithium-ion secondary battery of an embodiment of the disclosure.

FIG. 1 is a schematic view illustrating an example of a configuration of a lithium-ion secondary battery of the embodiment. A battery 1000 includes at least a housing 100. An electrode group 50 and an electrolytic solution (not illustrated) are accommodated in the housing 100. The electrode group 50 is electrically connected to a positive electrode current collecting tab 51 and a negative electrode current collecting tab 52. The positive electrode current collecting tab 51 is electrically connected to a positive electrode terminal 61 (external terminal). The negative electrode current collecting tab 52 is electrically connected to a negative electrode terminal 62 (external terminal). The electrolytic solution contains a holding electrolytic solution and an excess electrolytic solution. The electrode group 50 is impregnated with the holding electrolytic solution. The excess electrolytic solution is stored at the bottom portion of the housing 100.

Housing

The housing 100 illustrated in FIG. 1 is rectangular (flat rectangular parallelepiped). However, the housing of the embodiment may also be cylindrical. The housing 100 is typically formed of a metal material such as aluminum (Al), an Al alloy, or stainless steel. The housing may also be formed of, for example, an aluminum laminate film as long as predetermined sealability can be realized. The housing 100 includes, for example, a body 101 and a lid 102. The body 101 and the lid 102 may be joined to each other, for example, by laser welding. The lid 102 is provided with a gas discharge valve 130 and an injection hole 140.

Pressure Operated Safety Mechanism

The battery 1000 includes at least a pressure operated safety mechanism configured to operate in response to the internal pressure of the housing 100. In the embodiment, as an example of the pressure operated safety mechanism, a current interrupt device (CID) and an external short circuit mechanism are described. However, the pressure operated safety mechanism is not limited thereto as long as the mechanisms operate in response to the internal pressure of the housing 100. The battery of the embodiment includes both the current interrupt device and the external short circuit mechanism, and may also include at least one of the current interrupt device and the external short circuit mechanism.

Current Interrupt Device

Figure 2:
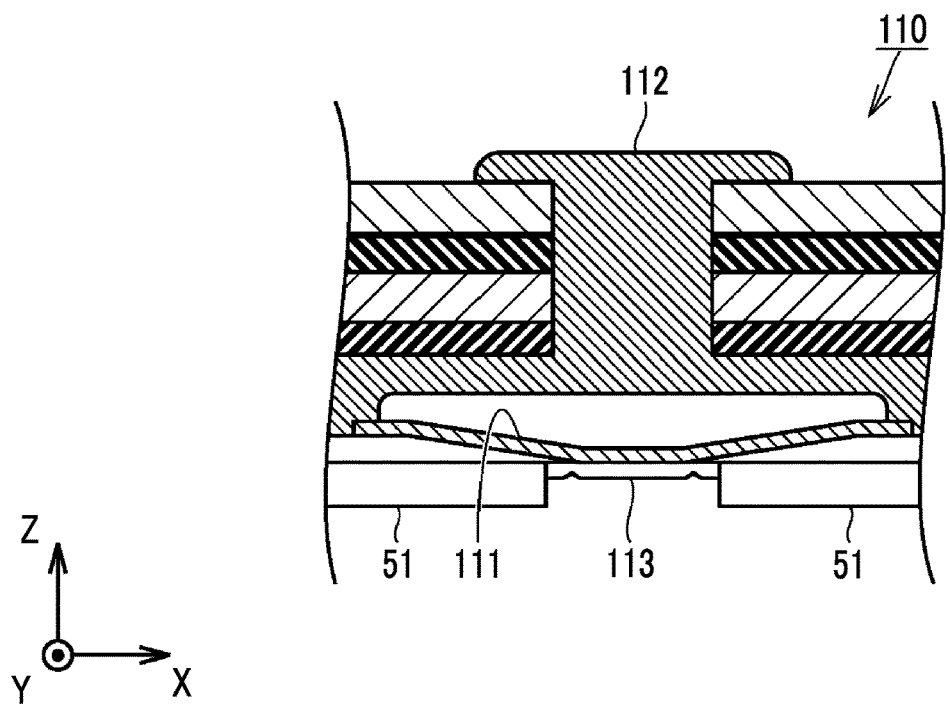
FIG. 2 is a first schematic sectional view illustrating an example of a configuration of a current interrupt device.

As illustrated in FIG. 1, a current interrupt device 110 is provided in the middle of a circuit that connects the electrode group 50 to the positive electrode terminal 61. FIG. 2 is a first schematic sectional view illustrating an example of a configuration of the current interrupt device. The current interrupt device 110 is constituted by a reversing plate 111, a rivet 112, and a rupture disc 113. The reversing plate 111 has a shape in which the center thereof protrudes toward the rupture disc 113. The rupture disc 113 is electrically connected to the positive electrode current collecting tab 51. The rivet 112 is electrically connected to the reversing plate 111. The rivet 112 is also electrically connected to the positive electrode terminal 61 (see FIG. 1). During charging, current flows through the positive electrode terminal 61, the rivet 112, the reversing plate 111, the rupture disc 113, the positive electrode current collecting tab 51, and the electrode group 50 in this order.

Figure 3:
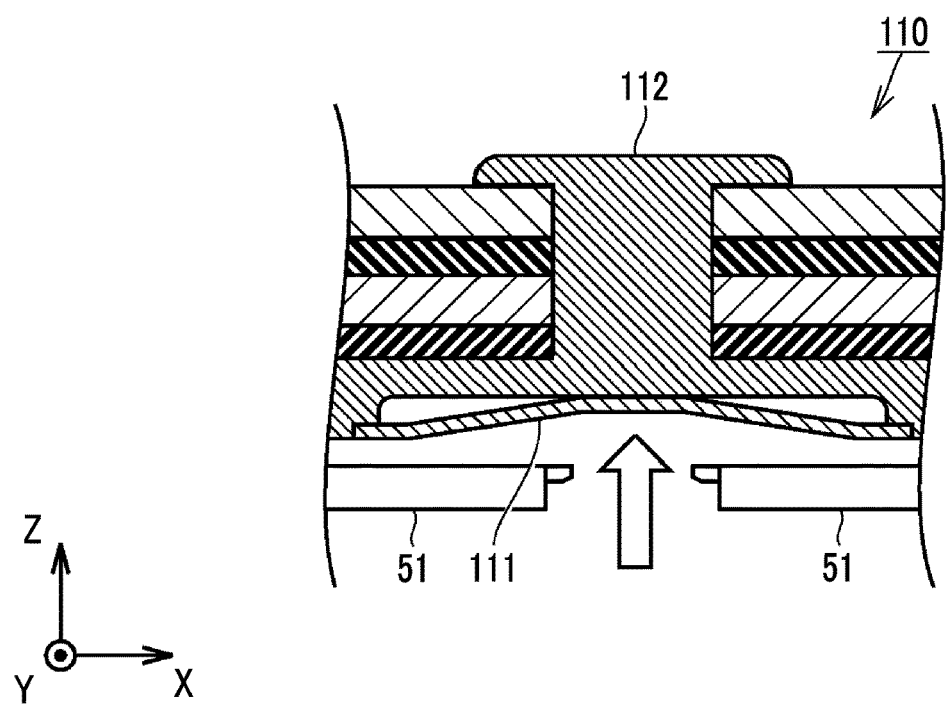
FIG. 3 is a second schematic sectional view illustrating an example of the configuration of the current interrupt device.

FIG. 3 is a second schematic sectional view illustrating an example of the configuration of the current interrupt device. During overcharging, when gas is generated in the housing 100 and the internal pressure increases, the rupture disc 113 is pressed by the gas. When the internal pressure exceeds a predetermined value (also referred to as "operating pressure"), the rupture disc 113 bursts. The reversing plate 111 is pressed by the gas and deforms to become close to the rivet 112. Accordingly, a circuit between the positive electrode current collecting tab 51 and the rivet 112 is broken. That is, the circuit that connects the electrode group 50 to the positive electrode terminal 61 is broken. The broken circuit causes a state in which further charging cannot be performed.

Here, an example in which the current interrupt device 110 is provided on the positive electrode terminal 61 side is described. However, the current interrupt device 110 may also be provided on the negative electrode terminal 62 side. The current interrupt device 110 may also be provided on both the positive electrode terminal 61 side and the negative electrode terminal 62 side.

External Short Circuit Mechanism

Figure 4:
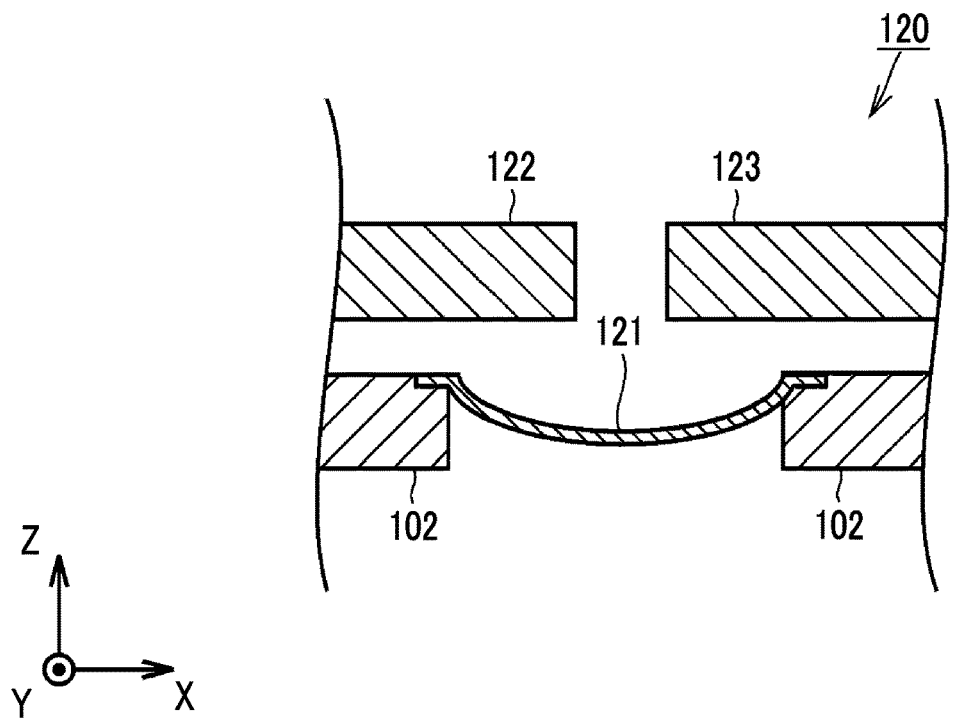
FIG. 4 is a first schematic sectional view illustrating an example of a configuration of an external short circuit mechanism.

As illustrated in FIG. 1, the housing 100 is provided with an external short circuit mechanism 120. FIG. 4 is a first schematic sectional view illustrating an example of a configuration of the external short circuit mechanism. The external short circuit mechanism 120 is constituted by a reversing plate 121, a positive electrode short circuit plate 122, and a negative electrode short circuit plate 123. The reversing plate 121 has a shape in which the center thereof protrudes toward the inside of the housing 100. The positive electrode short circuit plate 122 is electrically connected to the positive electrode terminal 61 (see FIG. 1). The negative electrode short circuit plate 123 is electrically connected to the negative electrode terminal 62. Normally, there is a gap between the positive electrode short circuit plate 122 and the negative electrode short circuit plate 123 such that the positive electrode short circuit plate 122 and the negative electrode short circuit plate 123 are not electrically connected to each other.

Figure 5:
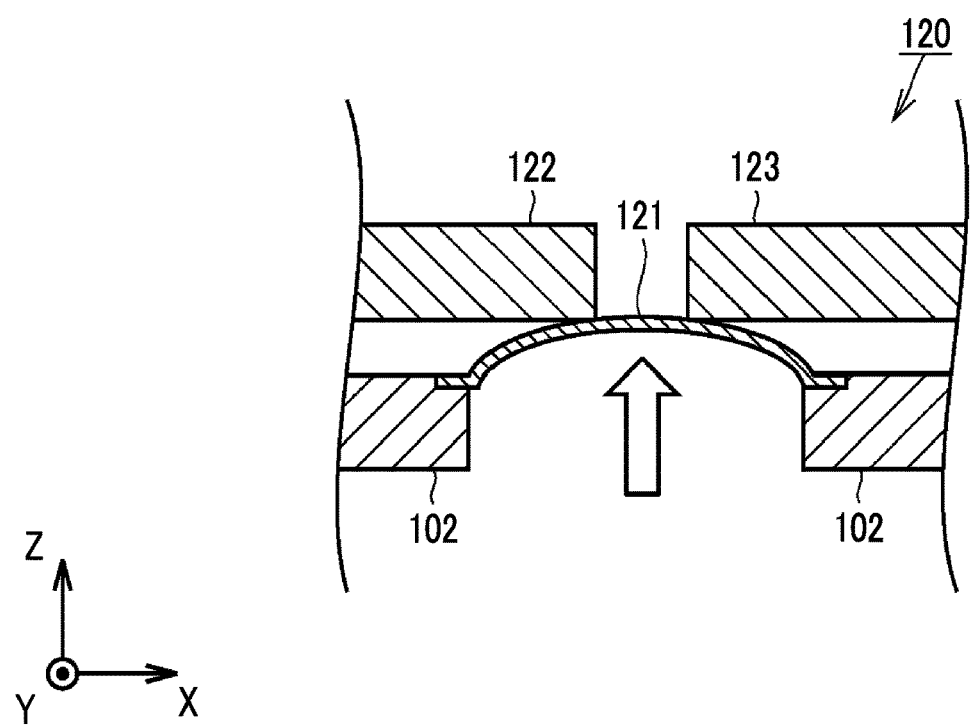
FIG. 5 is a second schematic sectional view illustrating an example of the configuration of the external short circuit mechanism.

FIG. 5 is a second schematic sectional view illustrating an example of the configuration of the external short circuit mechanism. During overcharging, when gas is generated in the housing 100 and the internal pressure increases, the reversing plate 121 is pressed by the gas. When the internal pressure exceeds a predetermined value (operating pressure), the reversing plate 121 deforms toward the positive electrode short circuit plate 122 and the negative electrode short circuit plate 123 and comes into contact with both the positive electrode short circuit plate 122 and the negative electrode short circuit plate 123. Accordingly, the positive electrode short circuit plate 122 and the negative electrode short circuit plate 123 are short-circuited through the reversing plate 121 such that a short circuit is formed. As current flows through the short circuit, energy stored in the battery 1000 is consumed and thus the battery 1000 transitions to a safe state. For example, the short circuit current may be adjusted to have an appropriate magnitude depending on the material, shape, and the like of the reversing plate 121, the positive electrode short circuit plate 122, and the negative electrode short circuit plate 123.

Gas Discharge Valve

The gas discharge valve 130 is configured to discharge gas when the internal pressure of the housing 100 exceeds a predetermined value (operating pressure). In the battery 1000, the operating pressures may be set to cause the current interrupt device 110, the external short circuit mechanism 120, and the gas discharge valve 130 to operate in this order.

Electrode Group

Figure 6:
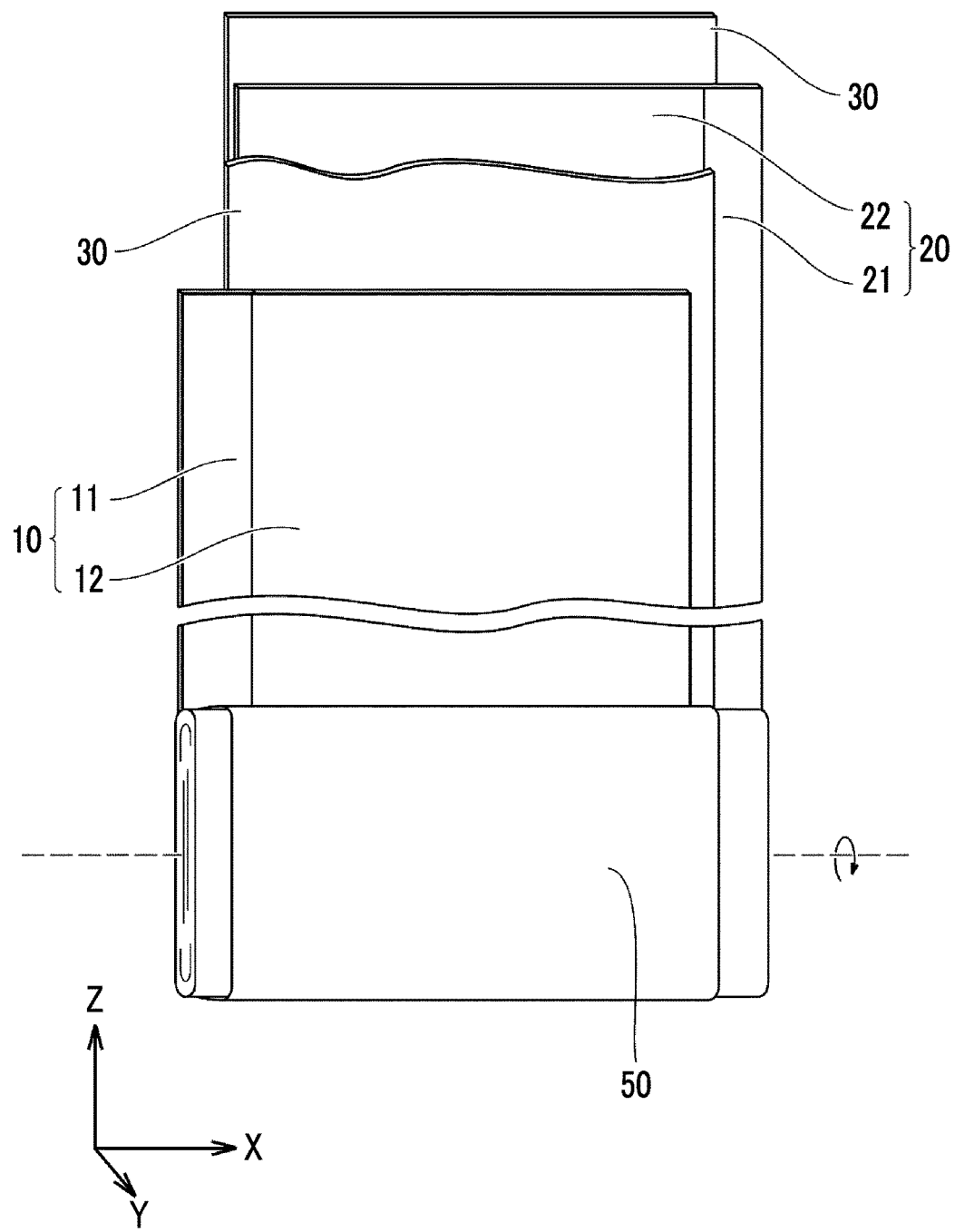
FIG. 6 is a schematic view illustrating an example of a configuration of an electrode group.

FIG. 6 is a schematic view illustrating an example of a configuration of the electrode group. The electrode group 50 includes a positive electrode 10, a negative electrode 20, and a separator 30. The electrode group 50 is impregnated with an electrolytic solution. That is, the battery 1000 includes the positive electrode 10, the negative electrode 20, and the electrolytic solution stored in the housing 100. The positive electrode 10, the negative electrode 20, and the separator 30 are all band-shaped sheets. The separator 30 is disposed between the positive electrode 10 and the negative electrode 20. The electrode group 50 is a wound electrode group. That is, the electrode group 50 is configured by laminating the positive electrode 10 and the negative electrode 20 with the separator 30 interposed therebetween and further winding the positive electrode 10, the negative electrode 20, and the separator 30 in a spiral shape.

The electrode group may have a laminated form. In a laminated electrode group (not illustrated), a positive electrode, a negative electrode, and a separator are, for example, rectangular sheets. The laminated electrode group may be configured by alternately laminating the positive electrodes and the negative electrodes with the separators interposed therebetween.

Positive Electrode

Figure 7:
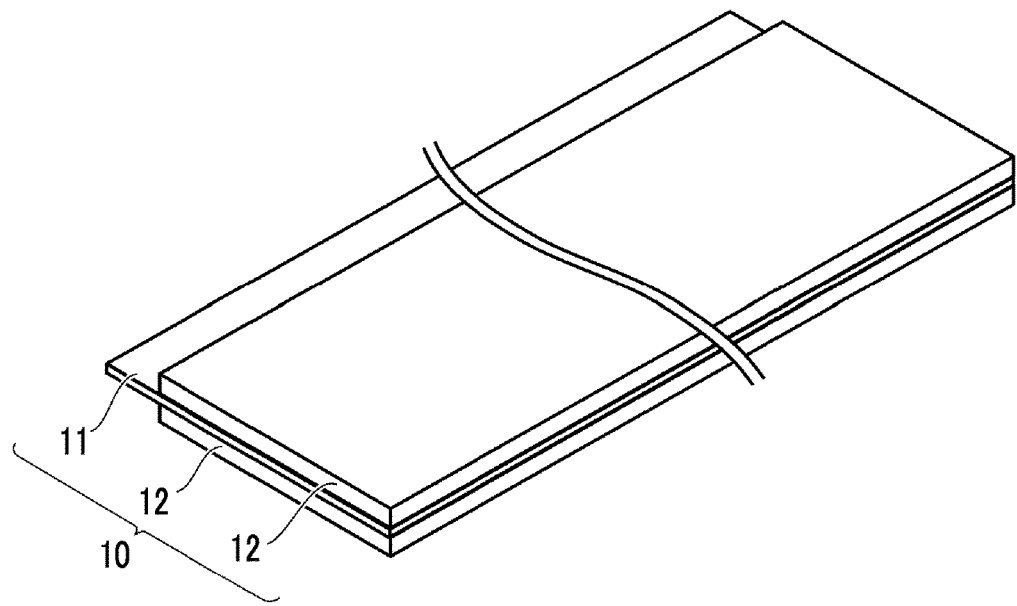
FIG. 7 is a schematic view illustrating an example of a configuration of a positive electrode.

FIG. 7 is a schematic view illustrating an example of a configuration of the positive electrode. The positive electrode 10 is a band-shaped sheet. The positive electrode 10 includes a positive electrode current collector 11 and positive electrode mixture layers 12. The positive electrode mixture layers 12 are formed on the surfaces of the positive electrode current collector 11. The positive electrode mixture layers 12 are disposed on both the front and rear surfaces of the positive electrode current collector 11. In the end portion of the positive electrode 10 in the width direction (corresponding to an X-axis direction in FIGS. 1 and 6), a portion of the positive electrode current collector 11 is exposed from the positive electrode mixture layers 12. With the portion, the positive electrode 10 can be electrically connected to the positive electrode current collecting tab 51.

The positive electrode current collector 11 may have a thickness of, for example, 10 μm to 30 μm (typically 12 μm to 30 μm). The positive electrode current collector 11 may be, for example, an Al foil. The Al foil may be a pure Al foil or an Al alloy foil.

The positive electrode mixture layer 12 may have a thickness of, for example, 10 μm to 150 μm (typically 50 μm to 150 μm on both the surfaces) on both the surfaces. The positive electrode mixture layer 12 contains first positive electrode active material particles and second positive electrode active material particles. That is, the positive electrode 10 contains the first positive electrode active material particles and the second positive electrode active material particles. The positive electrode mixture layer 12 may further contain a conductive material and a binder in addition to the first positive electrode active material particles and the second positive electrode active material particles. For example, the positive electrode mixture layer 12 may contain 1 mass % to 15 mass % of the conductive material, 0.5 mass % to 5 mass % of the binder, and the first positive electrode active material particles and the second positive electrode active material particles as the remainder.

The first positive electrode active material particles and the second positive electrode active material particles satisfy a relationship of first positive electrode active material particles:second positive electrode active material particles=74:26 to 48:52 in terms of mass ratio. In a case where the relationship described above is not satisfied, when charging progresses further, there is a possibility that the gas generation efficiency becomes lower than usual. The first positive electrode active material particles and the second positive electrode active material particles may satisfy a relationship of first positive electrode active material particles:second positive electrode active material particles=52:48 to 48:52 in terms of mass ratio. In the mass ratio, decimal places are rounded off.

First Positive Electrode Active Material Particles

The first positive electrode active material particles may have an average particle size of, for example, 1 μm to 30 μm (typically, 3 μm to 20 μm). The average particle size in the specification indicates a cumulative 50% particle size from the fine particle size in a volume-based particle size distribution measured according to a laser diffraction/scattering method.

The first positive electrode active material particles may have, for example, a layered rock-salt crystal structure. The composition of the first positive electrode active material particles is measured by inductively coupled plasma atomic emission spectroscopy (ICP-AES) (the same applies to the composition of the second positive electrode active material particles, which will be described later). The measurement is performed three or more times. The arithmetic average of three or more measurements is employed as the measurement result.

The first positive electrode active material particles have a first composition represented by a compositional formula $LiNi_{x1}Co_{y1}Mn_{z1}O_2$ (here, x1, y1, and z1 are numerical values satisfying 0<x1<1, 0<y1<1, 0.3<z1<0.5, and x1+y1+z1=1).

In the compositional formula, x1 and y1 may further satisfy 0.3<x1<0.5 and 0.1<y1<0.3. The Mn content (z1) of the first positive electrode active material particles is larger than the Mn content (z2) of the second positive electrode active material particles. Therefore, it is considered that the discharge curve of the first positive electrode active material particles is shifted toward a higher potential side from the discharge curve of the second positive electrode active material particles. The first positive electrode active material particles are expected to be in charge of an output at an intermediate SOC (about an SOC of 40% to an SOC of 60%). Furthermore, since the potential of the first positive electrode active material particles easily increases during overcharging, the gas generation reaction in the first positive electrode active material particles is expected to become more active.

Second Positive Electrode Active Material Particles

The second positive electrode active material particles may have an average particle size of, for example, 1 μm to 30 μm (typically, 3 μm to 20 μm). The second positive electrode active material particles may have, for example, a layered rock-salt crystal structure.

The second positive electrode active material particles have a second composition represented by a compositional formula $LiNi_{x2}Co_{y2}Mn_{z2}O_2$ (here, x2, y2, and z2 are numerical values satisfying 0<x2<1, 0<y2<1, 0<z2<0.2, and x2+y2+z2=1).

In the compositional formula, x2 and y2 may further satisfy 0.3<x2<0.5 and 0.4<y2<0.6. The Mn content (z2) of the second positive electrode active material particles is larger than the Mn content (z1) of the first positive electrode active material particles. Therefore, it is considered that the discharge curve of the second positive electrode active material particles is shifted toward a lower potential side from the discharge curve of the first positive electrode active material particles. The second positive electrode active material particles are expected to be in charge of an output at a low SOC (about an SOC of 0% to an SOC of 40%). By combining the first positive electrode active material particles and the second positive electrode active material particles for use, the enlargement of the SOC range in which a higher output than usual can be obtained (for example, a further improvement in the output at a low SOC) is expected.

Transition Metal Oxide

The surface of at least one of the first positive electrode active material particles and the second positive electrode active material particles is coated with a transition metal oxide. The transition metal oxide contains a transition metal other than Ni, Co, and Mn. It is considered that since the first positive electrode active material particles and the second positive electrode active material particles are coated with the transition metal oxide, a temperature rise during overcharging is promoted. Furthermore, it is considered that the transition metal oxide has an action of efficiently suppressing the elution of Mn.

The entire surface of at least one of the first positive electrode active material particles and the second positive electrode active material particles may be coated with the transition metal oxide, or a portion of the surface may be coated with the transition metal oxide. It is considered that even when the surface of the particles has a region that is not coated with the transition metal oxide, an effect of promoting the temperature rise and an effect of suppressing the elution of Mn are exhibited.

It is preferable that the surface of the first positive electrode active material particles is coated with the transition metal oxide. The Mn content (z1) of the first positive electrode active material particles is larger than the Mn content (z2) of the second positive electrode active material particles. It is considered that the potential of the first positive electrode active material particles more easily increases than the second positive electrode active material particles during overcharging. Therefore, the amount of gas generated from the first positive electrode active material particles is expected to be larger than the amount of gas generated from the second positive electrode active material particles. On the other hand, it is considered that the elution of Mn from the first positive electrode active material particles also easily occurs. It is considered that since the first positive electrode active material particles are coated with the transition metal oxide, the elution of Mn from the first positive electrode active material particles is efficiently suppressed, and the efficiency of gas generation when charging progresses further is further improved.

It is preferable that the transition metal oxide has a lower resistivity than the first positive electrode active material particles and the second positive electrode active material particles. It is considered that since the resistivity of the transition metal oxide is low, electron conduction at the surface of the particles is promoted. It is considered that this further promotes the gas generation reaction.

Whether or not the resistivity of the transition metal oxide is lower than those of the first positive electrode active material particles and the second positive electrode active material particles is confirmed by measuring the volume resistivity of the powder (also referred to as "powder resistivity") before and after a coating treatment. The powder resistivity can be measured by the powder resistivity measurement system "MCP-PD51" and the resistivity meter "Loresta GP" (both manufactured by Mitsubishi Chemical Analytech Co., Ltd.) or equivalents thereof. A powder sample is set to, for example, 3 g. A sample chamber is filled with the powder sample. The powder sample is pressurized by a probe. In a state in which the powder sample is pressurized at a pressure of 63 MPa, the volume resistivity of the powder sample (compact) is measured. The measurement is performed three or more times. The arithmetic average of three or more measurements is employed as the measurement result.

The first positive electrode active material particles before the coating treatment may have a powder resistivity of, for example, 731 Ω·cm. For example, the first positive electrode active material particles after the coating treatment may have a powder resistivity of 429 Ω·cm or more and 723 Ω·cm or less, may have a powder resistivity of 429 Ω·cm or more and 621 Ω·cm or less, may have a powder resistivity of 429 Ω·cm or more and 496 Ω·cm or less, or may have a powder resistivity of 429 Ω·cm or more and 463 Ω·cm or less.

The second positive electrode active material particles before the coating treatment may have a powder resistivity of, for example, 128 Ω·cm. For example, the second positive electrode active material particles after the coating treatment may have a powder resistivity of 80.3 Ω·cm or more and 114 Ω·cm or less, may have a powder resistivity of 80.3 Ω·cm or more and 109 Ω·cm or less, may have a powder resistivity of 80.3 Ω·cm or more and 87.7 Ω·cm or less, or may have a powder resistivity of 80.3 Ω·cm or more and 84.2 Ω·cm or less.

The transition metal oxide may be at least one selected from the group consisting of titanium oxide (for example, $TiO_2$), tungsten oxide (for example, $WO_3$) and molybdenum oxide (for example $MoO$). The transition metal oxide mentioned above has a low resistivity and is suitable for the transition metal oxide of the embodiment. In the specification, in a case where a compound name is described while the composition thereof is not limited, for example, in a case of "titanium oxide", the described compound has any composition known in the related art. For example, titanium oxide may have a stoichiometric composition of $TiO_2$, or may have a non-stoichiometric composition or $TiO_{1.8}$ (oxygen-deficient), $Ti_{0.8}O_2$ (metal ion-deficient or oxygen-excessive), or the like. The transition metal oxide is preferably titanium oxide. The titanium oxide tends to have a particularly low resistivity.

The coating treatment may be performed, for example, according to a liquid phase method. Here, as an example of the liquid phase method, a sol-gel method is described. First, a transition metal alkoxide (for example, titanium alkoxide) is prepared. In liquid phase, the transition metal alkoxide and at least one of the first positive electrode active material particles and the second positive electrode active material particles are mixed with each other. The mixture is dried. After the drying, the mixture is heated at a temperature of, for example, 400° C. or higher and 600° C. or lower. The heating can be performed in the atmosphere. The heating time is, for example, about one hour to two hours. Accordingly, the surface of at least one of the first positive electrode active material particles and the second positive electrode active material particles can be coated with the transition metal oxide.

The coating treatment may be performed according to the liquid phase method such as a coprecipitation method. The coating treatment may be performed according to a gas phase method such as a chemical vapor deposition (CVD) method or an atomic layer deposition (ALD) method.

The coating amount can be calculated by measuring the mass increment of the powder before and after the coating treatment. The coating amount is calculated by the following calculation formula.

$$\text{Coating amount} = \{(\text{mass after coating treatment}) - (\text{mass before coating treatment}) \div (\text{mass after coating treatment})\} \times 100\%$$

The coating amount of the transition metal oxide coating the first positive electrode active material particles or the second positive electrode active material particles may be 2 mass % or more and 6 mass % or less. When the coating amount is 2 mass % or more, the effect of suppressing the elution of Mn is expected to further increase. When the coating amount is 6 mass % or less, it is considered that the inhibition of the diffusion of Li ions due to the transition metal oxide is efficiently suppressed. The coating amount may be 4 mass % or more and 6 mass % or less. Accordingly, the gas generation reaction is expected to be further promoted.

Conductive Material

The conductive material is not particularly limited. For example, the conductive material may be acetylene black (AB), thermal black, furnace black, vapor grown carbon fiber (VGCF), or graphite. One kind of conductive material may be used singly, or two or more kinds of conductive material may be used in combination.

Binder

The binder is also not particularly limited. For example, the binder may be polyvinylidene fluoride (PVdF), polytetrafluoroethylene (PTFE), polyacrylic acid (PAA), or carboxymethyl cellulose (CMC). One kind of binder may be used singly, or two or more kinds of binder may be used in combination.

Negative Electrode

Figure 8:
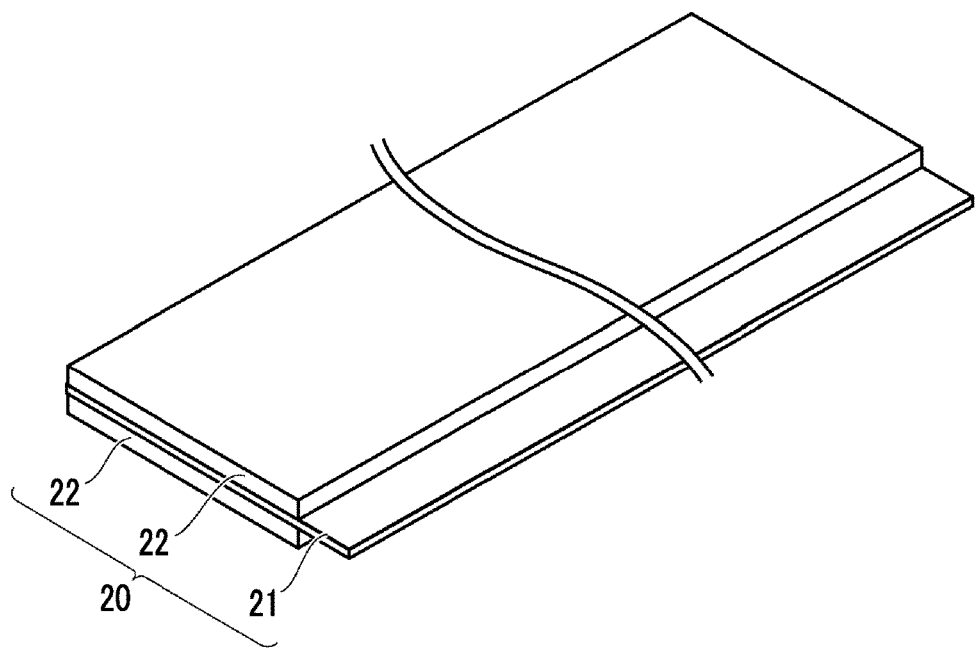
FIG. 8 is a schematic view illustrating an example of a configuration of a negative electrode.

FIG. 8 is a schematic view illustrating an example of a configuration of the negative electrode. The negative electrode 20 is a band-shaped sheet. The negative electrode 20 includes a negative electrode current collector 21 and negative electrode mixture layers 22. The negative electrode mixture layers 22 are formed on the surfaces of the negative electrode current collector 21. The negative electrode mixture layers 22 are disposed on both the front and rear surfaces of the negative electrode current collector 21. In the end portion of the negative electrode 20 in the width direction (corresponding to the X-axis direction in FIGS. 1 and 6), a portion of the negative electrode current collector 21 is exposed from the negative electrode mixture layers 22. With the portion, the negative electrode 20 can be electrically connected to the negative electrode current collecting tab 52.

The negative electrode current collector 21 may have a thickness of, for example, 5 μm to 30 μm (typically 6 μm to 15 μm). The negative electrode current collector 21 may be a copper (Cu) foil. The Cu foil may be a pure Cu foil or a Cu alloy foil.

The negative electrode mixture layer 22 may have a thickness of, for example, 10 μm to 150 μm (typically 50 μm to 100 μm on both the surfaces) on both the surfaces. The negative electrode mixture layer 22 contains negative electrode active material particles and a binder. For example, the negative electrode mixture layer 22 may contain 0.5 mass % to 5 mass % of the binder and the negative electrode active material particles as the remainder.

The negative electrode active material particles are not particularly limited. For example, the negative electrode active material particles may be graphite, easily graphitizable carbon, non-graphitizable carbon, silicon, silicon oxide, tin, or tin oxide. The binder is also not particularly limited. For example, the binder may be CMC or styrene butadiene rubber (SBR).

Electrolytic Solution

The electrolytic solution contains an overcharge additive. For example, the electrolytic solution contains 0.5 mass % or more and 10 mass % or less (typically, 1 mass % or more and 5 mass % or less) of overcharge additive, and a solvent and a lithium salt as the remainder. The overcharge additive may be dissolved in the solvent or may be dispersed in the solvent. The mass ratio of the overcharge additive can be measured by, for example, GC-MS (gas chromatography-mass spectrometry). The measurement is performed three or more times. The arithmetic average of three or more measurements is employed as the measurement result. In a case where two or more kinds of overcharge additive are used in combination, the sum of the mass ratios of the overcharge additives is regarded as the mass ratio of the overcharge additives.

Overcharge Additive

The overcharge additive is typically a compound that has a lower oxidation potential than the solvent. The oxidation potential can be measured by, for example, cyclic voltammetry (CV). The magnitude relation of the oxidation potential can also be measured by, for example, molecular orbital calculation. That is, a compound having a high highest occupied molecular orbital (HOMO) is regarded as having a relatively low oxidation potential. The overcharge additive may be at least one selected from the group consisting of CHB, BP, MPC, DPC, and TPP. The compound mentioned above causes a relatively large amount of gas to be generated and is thus suitable for the overcharge additive of the embodiment. From the viewpoint of the amount of generated gas, the overcharge additive is preferably CHB and BP.

Solvent

The solvent is aprotic. The solvent contains, for example, a cyclic carbonate and a chain carbonate. The mixing ratio of the cyclic carbonate and the chain carbonate is, for example, cyclic carbonate:chain carbonate=1:9 to 5:5 in terms of volume ratio.

Examples of the cyclic carbonate include ethylene carbonate (EC), propylene carbonate (PC), butylene carbonate (BC), and fluoroethylene carbonate (FEC). One kind of cyclic carbonate may be used singly, or two or more kinds thereof may be used in combination. Examples of the chain carbonate include dimethyl carbonate (DMC), ethyl methyl carbonate (EMC), and diethyl carbonate (DEC). One kind of chain carbonate may be used singly, or two or more kinds thereof may be used in combination.

The solvent may contain, for example, lactone, a cyclic ether, a chain ether, and a carboxylic acid ester. Examples of the lactone include γ-butyrolactone (GBL) and δ-valerolactone. Examples of the cyclic ether include tetrahydrofuran (THF), 1,3-dioxolane, and 1,4-dioxane. Examples of the chain ether include 1,2-dimethoxyethane (DME). Examples of the carboxylic acid ester include methyl formate (MF), methyl acetate (MA), and methyl propionate (MP).

Lithium Salt

The lithium salt functions as a support electrolyte. The lithium salt is dissolved in the solvent. The electrolytic solution may contain, for example, 0.5 mol/l to 2.0 mol/l of the lithium salt. Examples of the lithium salt include $LiPF_6$, $LiBF_4$, $Li[N(FSO_2)_2]$, and $Li[N(CF_3SO_2)_2]$. One kind of lithium salt may be used singly, or two or more kinds thereof may be used in combination.

Other Components

The remainder excluding the overcharge additive may further contain the other components in addition to the solvent and the lithium salt. As the other components, for example, additives such as a film forming agent can be considered. Examples of the film forming agent include vinylene carbonate (VC), vinyl ethylene carbonate (VEC), $Li[B(C_2O_4)_2]$ (commonly called "LiBOB"), $LiPO_2F_2$, propane sultone (PS), and ethylene sulfite (ES). The electrolytic solution may contain, for example, 0.1 mass % to 5 mass % of the other components.

Separator

The battery 1000 includes the separator 30. That is, the battery of the embodiment may further include the separator. The separator 30 is a porous film having electrically insulating properties. The separator 30 electrically separates the positive electrode 10 and the negative electrode 20 from each other. The separator 30 may have a thickness of, for example, 5 μm to 30 μm.

The separator 30 is formed of, for example, a porous polyethylene (PE) film, or a porous polypropylene (PP) film. The separator 30 may have a multilayer structure. For example, the separator 30 may be configured by laminating a porous PP film, a porous PE film, and a porous PP film in this order. The separator 30 may include a heat-resistant layer on its surface. The heat-resistant layer contains a heat-resistant material. Examples of the heat-resistant material include an inorganic filler such as alumina and a resin having a relatively high melting point such as polyimide.

Hereinafter, examples will be described. However, the following examples do not limit the scope of the disclosure.

Coating Treatment

The following ternary positive electrode active material particles were prepared.

First positive electrode active material particles: $LiNi_{0.4}Co_{0.2}Mn_{0.4}O_2$ Second positive electrode active material particles: $LiNi_{0.4}Co_{0.5}Mn_{0.1}O_2$ By the method described above, the powder resistivity of the ternary positive electrode active material particles before the coating treatment was measured. The results are shown in the row of "Particle No. 1-1" and the row of "Particle No. 2-1" in Table 1 below.

Titanium alkoxide, tungsten alkoxide, and molybdenum alkoxide were prepared. The ternary positive electrode active material particles were subjected to the coating treatment to so as to have a coating amount shown in Table 1 below. As a result, Particles Nos. 1-2 to 1-6 and Particles Nos. 2-2 to 2-6 were prepared. After the coating treatment, the powder resistivity was measured by the method described above. The results are shown in Table 1 below.

TABLE 1

List of coating treatment

| Particle No. | Composition | Transition metal oxide | Coating amount mass % | Powder resistivity $\Omega \cdot cm$ |
|---|---|---|---|---|
| 1-1 | $LiNi_{0.4}Co_{0.2}Mn_{0.4}O_2$ | — | 0 | 731 |
| 1-2 | $LiNi_{0.4}Co_{0.2}Mn_{0.4}O_2$ | $TiO_2$ | 2 | 496 |
| 1-3 | $LiNi_{0.4}Co_{0.2}Mn_{0.4}O_2$ | $TiO_2$ | 4 | 463 |
| 1-4 | $LiNi_{0.4}Co_{0.2}Mn_{0.4}O_2$ | $TiO_2$ | 6 | 429 |
| 1-5 | $LiNi_{0.4}Co_{0.2}Mn_{0.4}O_2$ | $WO_3$ | 4 | 621 |
| 1-6 | $LiNi_{0.4}Co_{0.2}Mn_{0.4}O_2$ | $MoO$ | 4 | 723 |
| 2-1 | $LiNi_{0.4}Co_{0.5}Mn_{0.1}O_2$ | — | 0 | 128 |
| 2-2 | $LiNi_{0.4}Co_{0.5}Mn_{0.1}O_2$ | $TiO_2$ | 2 | 87.7 |
| 2-3 | $LiNi_{0.4}Co_{0.5}Mn_{0.1}O_2$ | $TiO_2$ | 4 | 84.2 |
| 2-4 | $LiNi_{0.4}Co_{0.5}Mn_{0.1}O_2$ | $TiO_2$ | 6 | 80.3 |
| 2-5 | $LiNi_{0.4}Co_{0.5}Mn_{0.1}O_2$ | $WO_3$ | 4 | 109 |
| 2-6 | $LiNi_{0.4}Co_{0.5}Mn_{0.1}O_2$ | $MoO$ | 4 | 114 |

Production of Lithium-Ion Secondary Battery

EXAMPLE 1

The following materials were prepared.
Conductive material: AB
Binder: PVdF
Solvent: N-methyl-2-pyrrolidone (NMP)
Positive electrode current collector: Al foil (thickness 12 µm)

A positive electrode slurry was prepared by mixing a total of 93 parts by mass of Particle No. 1-3 and Particle No. 2-1, 4 parts by mass of the conductive material, 3 parts by mass of the binder, and a predetermined amount of the solvent. The mixing ratio of Particle No. 1-3 and Particle No. 2-1 was set to Particle No. 1-3:Particle No. 2-1=75:25 in terms of mass ratio. Excluding the transition metal oxides, the mixing ratio of first positive electrode active material particles and the second positive electrode active material particles was first positive electrode active material particles:second positive electrode active material particles=74:26 in terms of mass ratio.

Positive electrode mixture layers were formed by applying the positive electrode slurry to the surfaces (both the front and rear surfaces) of the positive electrode current collector and drying the resultant. As a result, a positive electrode was produced. The positive electrode was rolled such that the positive electrode had a thickness of 150 µm. Here, the thickness of the positive electrode indicates the sum of the thicknesses of the front and rear positive electrode mixture layer and the thickness of the positive electrode current collector. The positive electrode was cut such that the positive electrode had a length dimension of 6150 mm and a width dimension of 117 mm.

The following materials were prepared.
Negative electrode active material particles: graphite
Binder: CMC and SBR
Solvent: water
Negative electrode current collector: Cu foil (thickness 10 µm)

A negative electrode slurry was prepared by mixing 98.6 parts by mass of the negative electrode active material particles, 1.4 parts by mass of the binder (0.7 parts by mass of CMC and 0.7 parts by mass of SBR), and a predetermined amount of the solvent. Negative electrode mixture layers were formed by applying the negative electrode slurry to the surfaces (both the front and rear surfaces) of the negative electrode current collector and drying the resultant. As a result, a negative electrode was produced. The negative electrode was rolled such that the negative electrode had a thickness of 130 µm. Here, the thickness of the negative electrode indicates the sum of the thicknesses of the front and rear negative electrode mixture layers and the thickness of the negative electrode current collector. The negative electrode was cut such that the negative electrode had a length dimension of 6300 mm and a width dimension of 122 mm.

A band-shaped separator was prepared. The separator was set to have a thickness of 24 µm. The separator was configured by laminating a porous PP film, a porous PE film, and a porous PP film in this order. An electrode group was configured by laminating the positive electrode and the negative electrode with the separator interposed therebetween and further winding the laminate in a spiral shape. The electrode group was formed into a flat shape. Each of a positive electrode current collecting tab and a negative electrode current collecting tab was attached to the electrode group. A predetermined housing was prepared. The electrode group was accommodated in the housing.

An electrolytic solution containing the following components was prepared.
Solvent: [EC:DMC:EMC=3:3:4 (volume ratio)]
Li salt: $LiPF_6$ (1 mol/l)
Overcharge additive: CHB (2 mass %) and BP (2 mass %)
In Table 2 below, "CHB (2 mass %)" and BP (2 mass %) are abbreviated to "CHB (2)+BP (2)"

A predetermined amount of the electrolytic solution was injected into the housing. The housing was sealed. Thereby, a lithium-ion secondary battery was produced. The lithium-ion secondary battery was designed to have a capacity of 35 Ah in a voltage range of 3.0 V to 4.1 V.

EXAMPLE 2

A battery was produced in the same production method as in Example 1 except that the mixing ratio of Particle No. 1-3 and Particle No. 2-1 was set to Particle No. 1-3:Particle No. 2-1=50:50 in terms of mass ratio. Excluding the transition metal oxides, the mixing ratio of first positive electrode active material particles and the second positive electrode active material particles was first positive electrode active material particles:second positive electrode active material particles=49:51 in terms of mass ratio.

EXAMPLE 3

A battery was produced in the same production method as in Example 2 except that Particle No. 1-2 was used instead of Particle No. 1-3.

EXAMPLE 4

A battery was produced in the same production method as in Example 2 except that Particle No. 1-4 was used instead of Particle No. 1-3. Excluding the transition metal oxides, the mixing ratio of first positive electrode active material particles and the second positive electrode active material particles was first positive electrode active material particles:second positive electrode active material particles=48:52 in terms of mass ratio.

EXAMPLE 5

A battery was produced in the same production method as in Example 2 except that Particle No. 1-5 was used instead of Particle No. 1-3.

EXAMPLE 6

A battery was produced in the same production method as in Example 2 except that Particle No. 1-6 was used instead of Particle No. 1-3.

EXAMPLE 7

A battery was produced in the same production method as in Example 2 except that Particle No. 1-1 was used instead of Particle No. 1-3, and Particle No. 2-2 was used instead of Particle No. 2-1. Excluding the transition metal oxides, the mixing ratio of first positive electrode active material particles and the second positive electrode active material particles was first positive electrode active material particles:second positive electrode active material particles=51:49 in terms of mass ratio.

EXAMPLE 8

A battery was produced in the same production method as in Example 7 except that Particle No. 2-3 was used instead of Particle No. 2-2.

EXAMPLE 9

A battery was produced in the same production method as in Example 7 except that Particle No. 2-4 was used instead of Particle No. 2-2. Excluding the transition metal oxides, the mixing ratio of first positive electrode active material particles and the second positive electrode active material particles was first positive electrode active material particles:second positive electrode active material particles=52:48 in terms of mass ratio.

EXAMPLE 10

A battery was produced in the same production method as in Example 2 except that Particle No. 2-2 was used instead of Particle No. 2-1.

EXAMPLE 11

A battery was produced in the same production method as in Example 2 except that MPC (4 mass %) was used as the overcharge additive. In Table 2 below, "MPC (4 mass %)" is abbreviated to "MPC (4)".

EXAMPLE 12

A battery was produced in the same production method as in Example 2 except that DPC (4 mass %) was used as the overcharge additive. In Table 2 below, "DPC (4 mass %)" is abbreviated to "DPC (4)".

EXAMPLE 13

A battery was produced in the same production method as in Example 2 except that TPP (4 mass %) was used as the overcharge additive. In Table 2 below, "TPP (4 mass %)" is abbreviated to "TPP (4)".

Comparative Example 1

A battery was produced in the same production method as in Example 2 except that Particle No. 1-1 was used instead of Particle No. 1-3.

Comparative Example 2

A positive electrode slurry was prepared by mixing 93 parts by mass of Particle No. 1-3, 4 parts by mass of a conductive material, 3 parts by mass of a binder, and a predetermined amount of a solvent. Except for this, a battery was produced in the same production method as in Example 1.

Comparative Example 3

A positive electrode slurry was prepared by mixing 93 parts by mass of Particle No. 2-3, 4 parts by mass of a conductive material, 3 parts by mass of a binder, and a predetermined amount of a solvent. Except for this, a battery was produced in the same production method as in Example 1.

Evaluation: Measurement of Amount of Eluted Metal

The battery was fully charged. The battery was placed in a thermostat set at 85° C. The battery was preserved in the same environment for 72 hours. The battery after the preservation was disassembled and the negative electrode was recovered. The mass ratio of the metals (Ni, Co, and Mn) to the mass of the negative electrode mixture layer was measured by ICP-AES. The results are shown in the column of "amount of eluted metal at 85° C." in Table 2 below. It is considered that the metals detected from the negative electrode were eluted from the first positive electrode active material particles and the second positive electrode active material particles.

Overcharge Test

A pressure sensor was attached to the battery. In a room temperature environment, the battery was fully charged (SOC 100%) by a constant current-constant voltage method. The battery was placed in the thermostat set at 60° C. The battery was charged with a current of 35 A. During charging, the internal pressure at the time when the SOC reached 140% and the internal pressure at the time when the SOC reached 160% were measured. From the relationship between the spatial volume and the internal pressure in the housing, the amount of generated gas at the time when the SOC reached 140% and the amount of generated gas at the time when the SOC reached 160% were calculated. The results are shown in the columns of "amount of generated gas at 60° C. SOC 140%" and "amount of generated gas at 60° C. SOC 160%" in Table 2 below.

TABLE 2

List of examples and comparative examples

| | Positive electrode | | | | | | | Overcharging | |
| | First positive electrode active material particles $LiNi_{0.4}Co_{0.2}Mn_{0.4}O_2$ | | Second positive electrode active material particles $LiNi_{0.4}Co_{0.2}Mn_{0.1}O_2$ | | Mixing | Electrolytic solution | High-temperature preservation | 60° C. SOC 140% | 60° C. SOC 160% |
| | Transition metal oxide | Coating amount mass % | Transition metal oxide | Coating amount mass % | ratio (A):(B) | Overcharge additive Kind (mass %) | Amount of eluted metal at 85° C. ppm | Amount of generated gas ml | Amount of generated gas ml |
|---|---|---|---|---|---|---|---|---|---|
| Comparative Example 1 | — | — | — | — | 50:50 | CHB(2) + BP(2) | 1238 | 20 | 52 |
| Example 1 | $TiO_2$ | 4 | — | — | 74:26 | CHB(2) + BP(2) | 452 | 32 | 70 |
| Example 2 | $TiO_2$ | 4 | — | — | 49:51 | CHB(2) + BP(2) | 384 | 33 | 80 |
| Comparative Example 2 | $TiO_2$ | 4 | — | — | 100:0 | CHB(2) + BP(2) | 1531 | 26 | 47 |
| Comparative Example 3 | — | — | $TiO_2$ | 4 | 0:100 | CHB(2) + BP(2) | 411 | 17 | 33 |
| Example 3 | $TiO_2$ | 2 | — | — | 49:51 | CHB(2) + BP(2) | — | 33 | 78 |
| Example 4 | $TiO_2$ | 6 | — | — | 48:52 | CHB(2) + BP(2) | — | 34 | 86 |
| Example 5 | $WO_3$ | 4 | — | — | 49:51 | CHB(2) + BP(2) | — | 32 | 77 |
| Example 6 | MoO | 4 | — | — | 49:51 | CHB(2) + BP(2) | — | 33 | 78 |
| Example 7 | — | — | $TiO_2$ | 2 | 51:49 | CHB(2) + BP(2) | — | 24 | 61 |
| Example 8 | — | — | $TiO_2$ | 4 | 51:49 | CHB(2) + BP(2) | — | 27 | 64 |
| Example 9 | — | — | $TiO_2$ | 6 | 52:48 | CHB(2) + BP(2) | — | 31 | 67 |
| Example 10 | $TiO_2$ | 4 | $TiO_2$ | 2 | 51:49 | CHB(2) + BP(2) | — | 34 | 82 |
| Example 11 | $TiO_2$ | 4 | — | — | 49:51 | MPC(4) | — | 31 | 65 |
| Example 12 | $TiO_2$ | 4 | — | — | 49:51 | DPC(4) | — | 28 | 62 |
| Example 13 | $TiO_2$ | 4 | — | — | 49:51 | TPP(4) | — | 25 | 56 |

Results

In Comparative Example 1, the amount of eluted metal is relatively large. In Comparative Example 1, the amount of generated gas at the time when the SOC reached 140% and the amount of generated gas at the time when the SOC reached 160% are relatively small. It is considered that this is because both the first positive electrode active material particles and the second positive electrode active material particles were not coated with the transition metal oxide.

From the results from Examples 1, 2, 8, and 10, it is seen that the surface of at least one of the first positive electrode active material particles and the second positive electrode active material particles was coated with the transition metal oxide and thus the amount of generated gas was increased.

From the results of Comparative Examples 2 and 3, it is seen that in a case where either the first positive electrode active material particles or the second positive electrode active material particles were used, even when the active material particles used were coated with the transition metal oxide, the amount of generated gas was small.

From the results of Examples 2 and 8, it is seen that the surface of the first positive electrode active material particles was coated with the transition metal oxide and thus the amount of generated gas could be efficiently increased. In Example 10 in which the surface of both the first positive electrode active material particles and the second positive electrode active material particles was coated with the transition metal oxide, the amount of generated gas was further increased.

It was confirmed that regardless of whether the transition metal oxide was titanium oxide, tungsten oxide, or molybdenum oxide, the amount of generated gas was efficiency increased. From the results of Examples 2, 5, and 6, it is seen that in a case where the transition metal oxide was titanium oxide, the effect tends to be more significant than usual.

Even when the overcharge additive was any of CHB, BP, MPC, DPC, and TPP, the amount of generated gas could be efficiently secured. From the results of Examples 2 and 11 to 13, it is seen that in a case where CHB and BP are used in combination, the amount of generated gas tends to be larger than usual.

It should be noted that the embodiments and the examples are illustrative examples in all respects and are not restrictive. The scope of the disclosure is defined by the claims other than the description and is intended to include all changes within the meaning and scope equivalent to the claims.

What is claimed is:

1. A lithium-ion secondary battery comprising:
   a housing;
   a pressure operated safety mechanism configured to operate in response to an internal pressure of the housing;
   a positive electrode accommodated in the housing;
   a negative electrode accommodated in the housing; and
   an electrolytic solution stored in the housing, wherein:
   the positive electrode contains first positive electrode active material particles and second positive electrode active material particles;
   the first positive electrode active material particles and the second positive electrode active material particles satisfy a relationship of first positive electrode active material particles:second positive electrode active material particles=74:26 to 48:52 in terms of mass ratio;
   the first positive electrode active material particles have a first composition represented by a compositional formula as follows,

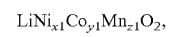
   $LiNi_{x1}Co_{y1}Mn_{z1}O_2$, here, x1, y1, and z1 are numerical values satisfying $0<x1<1$, $0<y1<1$, $0.3<z1<0.5$, and $x1+y1+z1=1$;

the second positive electrode active material particles have a second composition represented by a compositional formula as follows, $$LiNi_{x2}Co_{y2}Mn_{z2}O_2,$$

here, x2, y2, and z2 are numerical values satisfying $0<x2<1$, $0<y2<1$, $0<z2<0.2$, and $x2+y2+z2=1$;

a surface of at least one of the first positive electrode active material particles and the second positive electrode active material particles is coated with a transition metal oxide;

the transition metal oxide contains a transition metal other than Ni, Co, and Mn; and the electrolytic solution contains an overcharge additive.

2. The lithium-ion secondary battery according to claim 1, wherein the surface of the first positive electrode active material particles is coated with the transition metal oxide.

3. The lithium-ion secondary battery according to claim 1, wherein:

x1 and y1 are numerical values satisfying $0.3<x1<0.5$ and $0.1<y1<0.3$; and x2 and y2 are numerical values satisfying $0.3<x2<0.5$ and $0.4<y2<0.6$.

4. The lithium-ion secondary battery according to claim 1, wherein the transition metal oxide has a lower resistivity than the first positive electrode active material particles and the second positive electrode active material particles.

5. The lithium-ion secondary battery according to claim 1, wherein the transition metal oxide is at least one selected from the group consisting of titanium oxide, tungsten oxide, and molybdenum oxide.

6. The lithium-ion secondary battery according to claim 1, wherein, in the first positive electrode active material particles or the second positive electrode active material particles coated with the transition metal oxide, a mass ratio of the transition metal oxide to a total mass of the first positive electrode active material particles or the second positive electrode active material particles and the transition metal oxide is 2 mass % or more and 6 mass % or less.

7. The lithium-ion secondary battery according to claim 1, wherein the overcharge additive is at least one selected from the group consisting of cyclohexylbenzene, biphenyl, methylphenyl carbonate, diphenyl carbonate, and triphenyl phosphate.

* * * * *